(12) United States Patent
Brouda et al.

(10) Patent No.: US 8,995,821 B2
(45) Date of Patent: Mar. 31, 2015

(54) SYSTEM AND METHOD FOR TRANSFERRING DIGITAL CONTENT

(75) Inventors: David H. Brouda, Chalfont, PA (US); Mark G. Depietro, Harleysville, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 51 days.

(21) Appl. No.: 12/974,959

(22) Filed: Dec. 21, 2010

(65) Prior Publication Data

US 2012/0155836 A1  Jun. 21, 2012

(51) Int. Cl.
| | |
|---|---|
| *H04N 21/4627* | (2011.01) |
| *H04N 21/4147* | (2011.01) |
| *H04N 7/167* | (2011.01) |
| *G11B 20/00* | (2006.01) |
| *H04N 21/6334* | (2011.01) |
| *H04N 21/266* | (2011.01) |
| *H04N 21/254* | (2011.01) |

(52) U.S. Cl.
CPC ......... *H04N 21/4627* (2013.01); *H04N 7/1675* (2013.01); *G11B 20/00086* (2013.01); *H04N 21/4147* (2013.01); *H04N 21/63345* (2013.01); *H04N 21/26613* (2013.01); *H04N 21/254* (2013.01)
USPC .......................................................... 386/252

(58) Field of Classification Search
CPC .................... H04N 21/2541; H04N 21/26613; H04N 21/4126; H04N 21/4147; H04N 21/4627; H04N 21/63775; H04N 7/1675; G11B 20/00086
USPC ................................................ 386/252–261
See application file for complete search history.

(56) References Cited

U.S. PATENT DOCUMENTS

| | | | |
|---|---|---|---|
| 2002/0032905 A1* | 3/2002 | Sherr et al. | 725/38 |
| 2002/0131594 A1* | 9/2002 | Hori et al. | 380/201 |
| 2005/0050578 A1* | 3/2005 | Ryal | 725/143 |
| 2005/0216942 A1 | 9/2005 | Barton | |

(Continued)

FOREIGN PATENT DOCUMENTS

| | | |
|---|---|---|
| KR | 10-2009-0025293 | 3/2009 |
| WO | WO 2008/005701 A2 | 1/2008 |

OTHER PUBLICATIONS

PCT Search Report and Written Opinion, RE: Application #PCT/US11/065017; Feb. 23, 2012.

(Continued)

*Primary Examiner* — Gelek W Topgyal
(74) *Attorney, Agent, or Firm* — Fenwick & West LLP

(57) ABSTRACT

A device is provided for use with a digital content provider and a content purchaser. The content provider can provide digital content and a first digital key, wherein the digital content has quantified digital rights associated therewith. The device includes a receiving portion, a security portion, a content database, an interface portion and a transmitting portion. The receiving portion can receive the digital content and the first digital key. The security portion can access the digital content with the first digital key. The content database can store the digital content. The interface portion can offer to the content purchaser the digital content and can enable the content purchaser to purchase the digital content in accordance with purchased quantified digital rights. The security portion can further encrypt the digital content with a digital key such that the content purchaser may use the purchased digital content.

14 Claims, 5 Drawing Sheets

(56) References Cited

U.S. PATENT DOCUMENTS

2006/0015693 A1* 1/2006 Jeong ............ 711/161
2006/0127039 A1* 6/2006 van Stam ............ 386/94
2007/0074293 A1 3/2007 Ushimaru
2008/0002951 A1* 1/2008 Russ et al. ............ 386/124
2012/0066493 A1* 3/2012 Widergren et al. ............ 713/160

OTHER PUBLICATIONS

Notice of Preliminary Rejection for Korean Patent Application No. KR 10-2013-7019240, Jun. 17, 2014, 9 pages.

* cited by examiner

SYSTEM AND METHOD FOR TRANSFERRING DIGITAL CONTENT

BACKGROUND

In a common arrangement, service providers supply television, motion picture, music, and other content to subscribers in digital form. This digital content may be stored for later use by a subscriber on a digital recording device, such as a digital video recorder (DVR), located in the subscriber's home.

To protect producer's and distributer's intellectual property (IP) rights, some service providers maintain control over the digital content after it has been stored in a subscriber's DVR.

Before a service provider provides content to a subscriber's DVR, the service provider must determine whether the subscriber's DVR is secure and is authenticated.

A subscriber's DVR is secure if it has a device key and an encryption system therein, wherein the encryption system is able to encrypt content with the device key. Accordingly, any content provided by service provider may be encrypted by the subscriber's DVR with the subscriber's DVR device key. This is an important feature for protecting the rights of the owner of the content. In particular, the content owner may wish to limit the use of the content, wherein the particular use has been authorized only for the subscriber's DVR. As such, the subscriber may be unable to copy or transfer the content, as it will have been encrypted with a key that is unique to the suscriber's DVR.

Authentication of the subscriber's DVR verifies the identity of the DVR. Authentication may be performed by any known method, a non-limiting example of which includes Public Key Infrastructure (PKI), which is a set of hardware, software, people, policies, and procedures needed to create, manage, distribute, use, store, and revoke digital certificates. In cryptography, a PKI is an arrangement that binds public keys with respective user identities by means of a certificate authority (CA). The user identity must be unique within each CA domain. The binding is established through the registration and issuance process, which, depending on the level of assurance the binding has, may be carried out by software at a CA, or under human supervision. The PKI role that assures this binding is called the Registration Authority. For each user, the user identity, the public key, their binding, validity conditions and other attributes are made unforgettable in public key certificates issued by the CA. The PKI may be setup through a bidirectional handshake between the service provider and the DVR, wherein public and private keys are exchanged to establish secure communications and verify the identity of the DVR.

By design, a DVR encrypts content unique to itself with a device key that is associated with the DVR and that prevents stored content from being accessed if moved to a different DVR. The new DVR does not know how to decrypt the content that was previously encrypted by an old DVR unless the new DVR also has the device key, that was used to encrypt the content, from the old DVR.

A subscriber receiving digital content from a service provider may also purchase quantified IP rights in the digital content. These rights may be unlimited for playing, copying (having a copy of the content on more than one device) or moving purposes (having only one copy of the content on one device at any one time), or may be some combination of time duration and number of instances that the digital content can be played, copied or moved.

It may become necessary for the service provider to replace the DVR in the subscriber's home with a different unit. The replacement may be due to some type of failure with the original DVR or the DVR might be replaced with a new device with enhanced capabilities.

When transferring non-encrypted content from one DVR to another DVR, there typically is no problem. In such cases, any known copying system or method may be used. However, when a DVR includes encrypted content, the IP rights associated with the content must be taken into account. Problems exist when transferring encrypted content from one DVR to another, i.e., moving encrypted content such that only one copy of the content exists on one device at any one time. These problems will now be described with reference to FIG. 1.

FIG. 1 illustrates a conventional system 100 for transferring encrypted content from one DVR to another DVR.

As illustrated in the figure, conventional system 100 includes a service provider 102, a subscriber home 104 and a communication channel 110. Subscriber home 104 includes DVR 106, a DVR 108 and a channel 112.

Channel 110 may be any known communication media. Signals within channel 110 typically embody computer-readable instructions, data structures, program modules, or other data in a modulated data signal such as a carrier wave or other transport mechanism and include any information-delivery media. Non-limiting examples of communications media of channel 110 include wired media, such as wired networks and direct-wired connections, and wireless media such as acoustic, radio-frequency, infrared, etc. The term "computer-readable media" as used herein includes both storage and communications media.

Service provider 102 provides content to subscriber home 104 over channel 110. Within subscriber home 104, channel 110 enables content to be distributed from service provider 102 to DVR 106 or DVR 108.

Channel 110 may be any known channel medium, non-limiting examples of which include cable, fiber optic, and satellite, over which service provider 102 distributes digital content to subscriber home 104. Subscribers access digital content received from service provider 102 through any known method, non-limiting examples of which include sound systems and television.

Within subscriber home 104, DVR 106 and DVR 108 may be used to store digital content. Once stored on DVR 106 or DVR 108, digital content can be accessed by a subscriber as described above without additional interaction with service provider 102.

Within subscriber home 104, channel 112 may be any known channel medium, non-limiting examples of which include cable and Ethernet, used to transfer digital content retrieved from DVR 106 to DVR 108.

In operation, channel 110 supports two-way communication between service provider 102 and subscriber home 104. Subscriber request information is transmitted from subscriber home 104 to service provider 102 and digital content is transmitted from service provider 102 to subscriber home 104.

Digital content transmitted to subscriber home 104 may be stored on DVR 106 or DVR 108, in which case the applicable DVR autonomously encrypts the digital content using a device key unique to itself.

If digital content is transferred from DVR 106 to DVR 108 over channel 112, without the device key from DVR 106, DVR 108 is unable to decrypt the digital content and the subscriber cannot access it.

As an alternative, digital content from DVR 106 may be transferred to DVR 108 over channel 112 along with the device key from DVR 106. In this case, however, service provider 102 would either need to allow the subscriber to access the device key from old DVR 106 or have a technician perform the transfer at subscriber home 104.

If service provider 102 allows subscriber access to the device key, it loses control of intellectual property rights in the digital content.

If a service technician manages the task, the time required to transfer digital content may be quite long, resulting in considerable expense to the subscriber. A long transfer time also would inconvenience the subscriber by preventing normal use of both DVRs.

In either case, direct transfer of digital content from DVR 106 to DVR 108 requires the presence of both DVRs in subscriber home 104 at the same time. Four separate steps are therefore needed: install DVR 108; validate and authenticate DVR 108; transfer digital content from DVR 106 to DVR 108; finally, remove DVR 106. The first and last steps usually require a service technician, again resulting in considerable expense to the subscriber. Also, if DVR 106 is failing, scheduling delays might prevent access before digital content is lost.

As discussed above, transferring digital content from a DVR to a replacement device with conventional systems is not practical, requiring either loss of control by the service provider or significant burden on the subscriber in the form of time and expense. With no practical method of transferring digital content when a subscriber's DVR is replaced, the content and subscriber's IP rights are lost.

What is needed is a method of transferring encrypted digital content from one DVR to another DVR that is controllable by a service provider and does not place an undue burden on the service provider or subscriber.

BRIEF SUMMARY

The present invention provides a system and method of transferring encrypted digital content from one DVR to another DVR that is controllable by a service provider and does not place an undue burden on the service provider or subscriber.

In accordance with an aspect of the present invention, a method of transferring encrypted digital content from a first digital recording device to one of a digital recording device and a storage device is provided. The first digital recording device has the encrypted digital content and digital keys stored thereon. The digital keys enable the first digital recording device to play the digital content. The method includes: transmitting a release instruction to the first digital recording device; transmitting a download instruction to one of the digital recording device and the storage device; transferring the encrypted digital content and the digital keys from the first digital recording device to the digital recording device when transferring encrypted digital content from a first digital recording device directly to the digital recording device; and transferring the encrypted digital content from the first digital recording device to the storage device and transferring the digital keys to a key storage when transferring encrypted digital content from a first digital recording device directly to the storage device.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
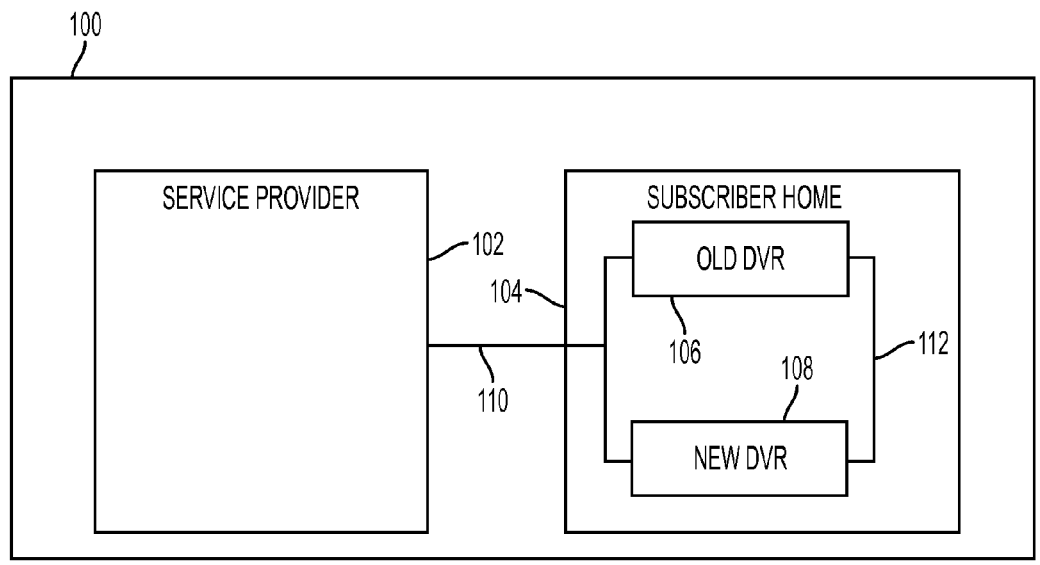
FIG. 1 illustrates a conventional system for transferring encrypted content from one DVR to another DVR.

In accordance with aspects of the present invention, a service provider is able to control the transfer of encrypted digital content from one DVR to another DVR in a subscriber home such that IP rights are moved with the encrypted digital content. Aspects of the present invention enable transfer of digital content directly to another DVR or to a storage device. This storage device may be networked to one DVR and the other DVR or directly attached to them, either simultaneously or sequentially.

A number of options are enabled by the invention. The digital content and key transfer process can be initiated remotely by the service provider through a local or remote technician, by an application on the subscriber's PC, by the subscriber through a web-based interface accessing either a server in the service provider's network, the first DVR, or some other device or method. Also, the content can be transferred as a foreground or background operation to the DVR's normal functions, so the subscriber is not deprived of the use of the DVR for an extended period.

A benefit of the invention is that the transfer of encrypted digital content and associated device key from one DVR may be a separate activity from the transfer of the encrypted content to another DVR. In such a case, DVR replacement can be achieved as a single step by a local technician or by the subscriber.

In accordance with an aspect of the present invention, a method is provided of transmitting instructions from a service provider to a subscriber home, thereby transferring both encrypted digital content and the original DVR's device key from the original DVR to the other DVR. A release instruction enables the movement of digital content and the device key from the original DVR. A download instruction may enable the receipt of digital content either directly by the other DVR or by a separate storage device in the subscriber home. Digital content then transfers from the original DVR to either the other DVR or the storage device.

If transferring digital content directly to the other DVR, the original DVR device key may also transfer directly to the other DVR. There are some situations where the digital content may not be transferred directly from the original DVR to the other DVR, such as, for example, another DVR has not yet been obtained. In such cases, in accordance with an aspect of the present invention, the encrypted content may be temporarily stored in a storage device within the user's home, whereas the device key associated with the encrypted content are transferred from the original DVR to a separate key storage under the control of the service provider. Upon installation of another DVR, the encrypted content may be transferred from the storage device and the device key associated with the encrypted content may be transferred from the separate key storage to the new DVR.

If transferring digital content to a storage device, an additional release instruction enables the movement of digital content from the storage device to the new DVR. An additional download instruction may enable the receipt of the digital content and the original DVR device key by the other DVR. Digital content then transfers from the storage device to the new DVR and the old DVR device key then transfers to the new DVR.

Example embodiments in accordance with aspects of the present invention will now be described with reference to FIG. 2 through FIG. 3B.

Figure 2:
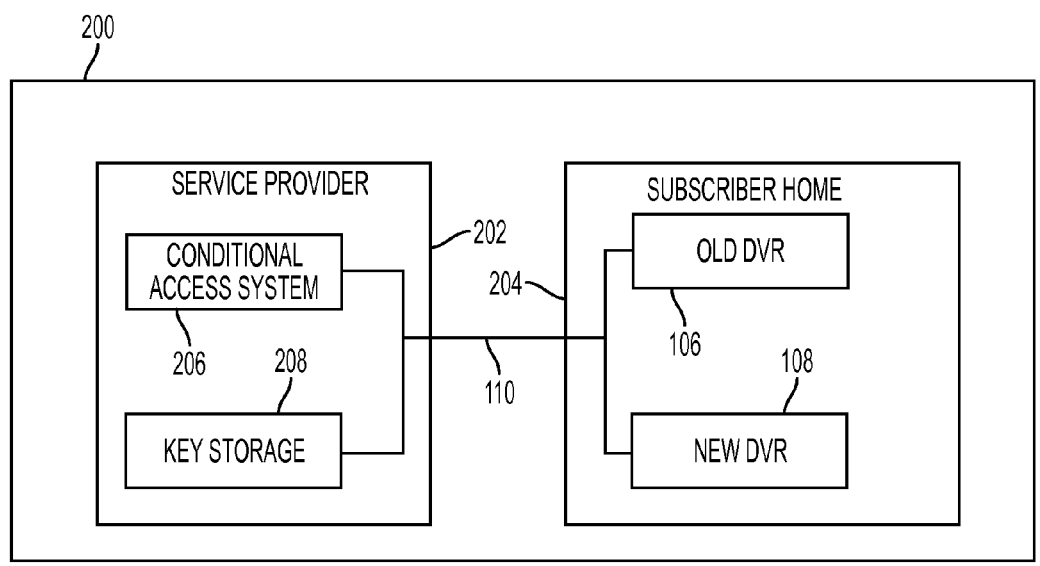
FIG. 2 illustrates an example embodiment of transferring encrypted content from one DVR to another DVR in accordance with an aspect of the present invention.

FIG. 2 illustrates an example system 200 for transferring encrypted content from one DVR to another DVR in accordance with an aspect of the present invention.

As illustrated in the figure, system 200 includes a service provider 202 and a subscriber home 204. Service provider 202 includes a conditional access system (CAS) 206 and a key storage device 208. Subscriber home 204 includes DVR 106 and DVR 108. In this example, each of CAS 206 and key storage device 208 are distinct devices. However, in other embodiments, CAS 206 and key storage device 208 may be combined as a unitary device. Further, in some embodiments at least one of CAS 206 and key storage device 208 may be implemented as computer-readable media for carrying or having computer-executable instructions or data structures stored thereon. Such computer-readable media can be any available media that can be accessed by a general purpose or special purpose computer. Non-limiting examples of computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (hardwired and/or wireless, or a combination of hardwired or wireless) to a computer, the computer properly views the connection as a computer-readable medium. Thus, any such connection is properly termed a computer-readable medium. Combinations of the above should also be included within the scope of computer-readable media Service provider 202 provides content to subscriber home 204 over channel 110. Within subscriber home 204, channel 110 enables this content to be distributed to DVR 106 and DVR 108. CAS 206 transmits signals used to control movement transmission of digital content and the device key from DVR 106 to DVR 108. Key storage device 208 provides optional temporary storage of the device key. In operation, CAS 206 transmits a release instruction over channel 110 to DVR 106. CAS 206 also transmits a download instruction over channel 110 to DVR 108. These instructions result in the transfer of encrypted digital content and the device key directly from DVR 106 to DVR 108 over channel 110 within subscriber home 204.

As discussed above, this example aspect of the present invention enables direct transfer of digital content and an device key from one DVR to another DVR in a subscriber home under the control of a service provider.

Another example embodiment of transferring encrypted content from one DVR to another DVR in accordance with an aspect of the present invention will now be described with reference to FIG. 3A and FIG. 3B.

Figure 3A:
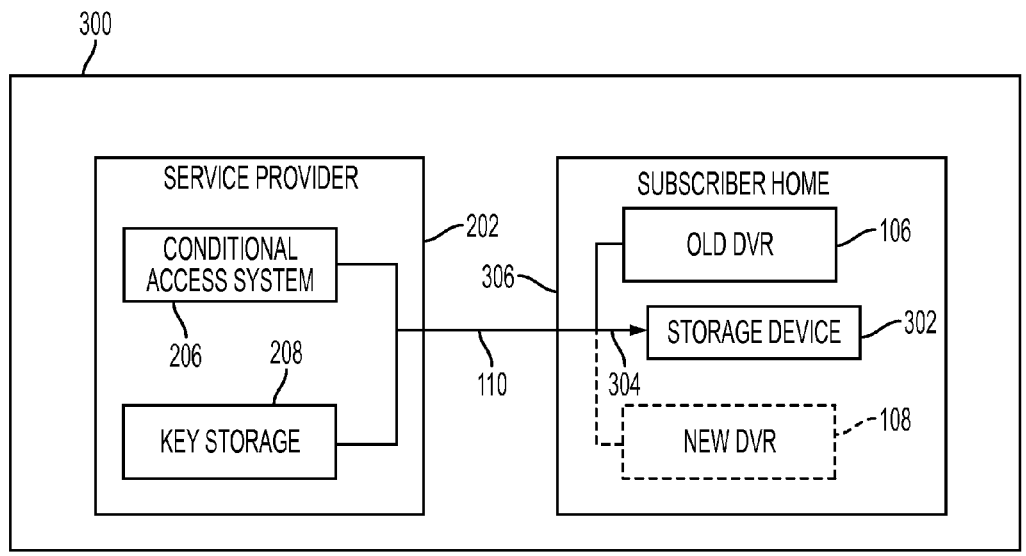
FIG. 3A illustrates an example embodiment of transferring encrypted content from an one DVR to another DVR in accordance with another aspect of the present invention.

FIG. 3A illustrates an example system 300, at a time $t_1$, for transferring encrypted content from one DVR to another DVR in accordance with an aspect of the present invention.

As illustrated in the figure, system 300 includes service provider 202 and a subscriber home 306. Subscriber home 306 includes DVR 106, a storage device 302, and a channel 304. DVR 108 may be present.

Channel 304 may be any known communication media. Signals within channel 110 typically embody computer-readable instructions, data structures, program modules, or other data in a modulated data signal such as a carrier wave or other transport mechanism and include any information-delivery media.

Encrypted content from DVR 106 may be transferred over channel 304 to storage device 302. Channel 304 may be any known channel medium, non-limiting examples of which include a dedicated path between DVR 106 and storage device 302 or a computer network in subscriber home 306. Non-limiting examples of storage device 302 include a directly attached storage device or a network attached storage device.

In operation, CAS 206 transmits a release instruction over channel 110 to DVR 106. CAS 206 also transmits a download instruction over channel 110 to storage device 302. These instructions result in the transfer of encrypted digital content from DVR 106 to storage device 302 over channel 304 within subscriber home 306 and the transfer of the device key from DVR 106 to key storage device 208 within service provider 202 over channel 110.

As discussed above, this example embodiment of an aspect of the present invention enables transfer of digital content and an device key from one DVR into separate storage devices under the control of a service provider. A benefit of this embodiment is that another DVR does not need to be present. For example, a subscriber may be planning to upgrade to a new DVR to take advantage of features not available with the original DVR. By transferring the original DVR content into separate storage devices, the subscriber is free to trade in or sell the original DVR prior to buying or renting the new DVR without losing this content. The subscriber therefore retains the ability to access this content with a new DVR and the service provider maintains control of IP rights-by controlling access to the key storage.

Figure 3B:
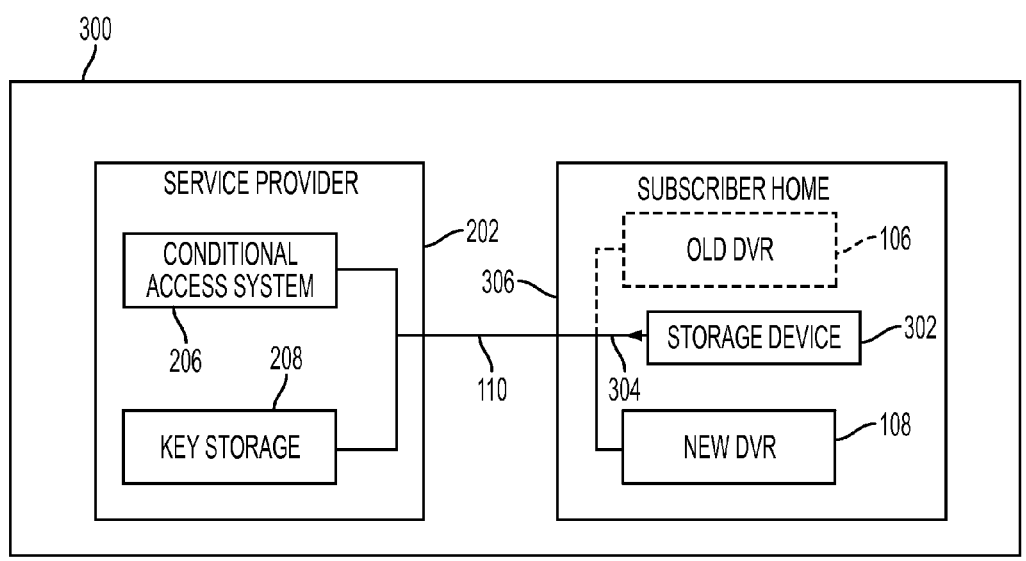
FIG. 3B illustrates an example embodiment of transferring encrypted content from one DVR to another DVR in accordance with another aspect of the present invention.

FIG. 3B illustrates example system 300, at a time $t_2$, after time $t_1$, as discussed above with reference to FIG. 3A.

As illustrated in the figure, system 300 includes service provider 202 and subscriber home 306. Subscriber home 306 includes DVR 108, storage device 302 and channel 304. DVR 106 may be present.

As discussed with reference to FIG. 3A, encrypted content has been moved from DVR 106 to storage device 302 and the device keys has been moved from DVR 106 to key storage device 208. At this point, encrypted content from storage device 302 may be transferred over channel 304 to DVR 108.

In operation, CAS 206 transmits a release instruction over channel 110 to storage device 302. CAS 206 also transmits a download instruction over channel 110 to DVR 108. These instructions result in the transfer of encrypted digital content from storage device 302 to DVR 108 over channel 304 within subscriber home 306 and the transfer of the device key from key storage device 208 within service provider 202 over channel 110 to DVR 108 within subscriber home 306.

As discussed in the example above, this aspect of the present invention enables transfer of digital content and an device key to another DVR from separate storage devices under the control of a service provider. A benefit of this embodiment is that the original DVR does not need to be present. A subscriber who has previously stored digital content from one DVR can therefore access the stored content with another DVR while the service provider maintains control of IP rights by controlling access to the key storage.

In the example embodiment illustrated in FIG. 2, both the encrypted digital content and device keys are transferred directly from one DVR to anther DVR. While both DVRs must be present for the transfer to take place, no additional storage devices are needed. In the example embodiment illustrated in FIG. 3A and FIG. 3B, encrypted digital content is transferred out of one DVR into a separate storage device, whereas the device keys are transferred out of the DVR into a separate key storage, such that the subscriber cannot gain control of the device keys. Encrypted content and device keys are then transferred out of the separate storage devices into another DVR with or without the presence of the original DVR. In both embodiments, the service provider maintains control of the IP rights associated with the transferred content.

Example embodiments of a conditional access system in accordance with aspects of the present invention will now be described with reference to FIG. 4.

Figure 4:
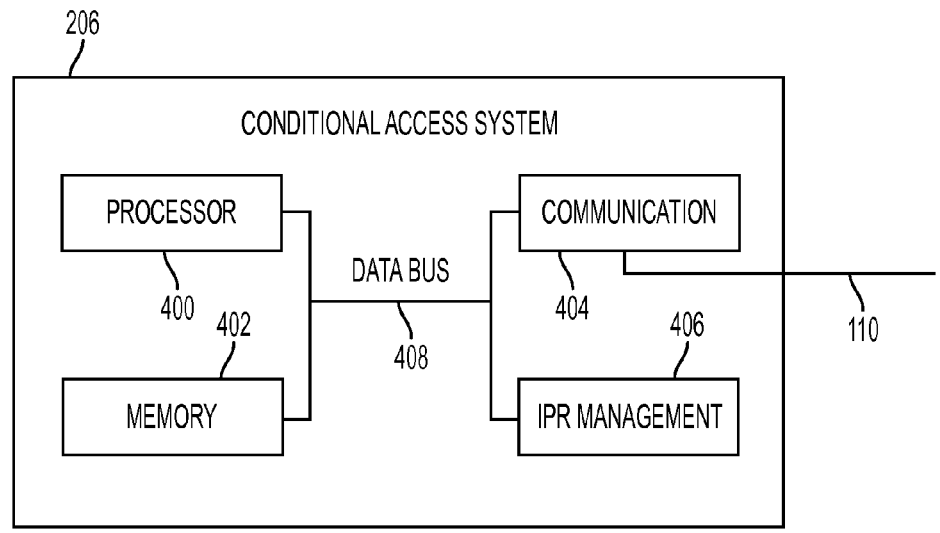
FIG. 4 illustrates an example structural embodiment of a conditional access system that may be used in accordance with an aspect of the present invention.

FIG. 4. illustrates an example CAS 206 in accordance with an aspect of the present invention.

CAS 206 includes a processor 400, a memory portion 402, a communication portion 404, an intellectual property rights (IPR) management portion 406 and a data bus 408. In this example, each of processor 400, memory portion 402, communication portion 404 and IPR management portion 406 are distinct devices. However, in other embodiments, at least two of processor 400, memory portion 402, communication portion 404 and IPR management portion 406 may be combined as a unitary device. Further, in some embodiments, at least one of processor 400, memory portion 402, communication portion 404 and IPR management portion 406 may be implemented as computer-readable media for carrying or having computer-executable instructions or data structures stored thereon. Such computer-readable media can be any available media that can be accessed by a general purpose or special purpose computer.

Channel 110 connects CAS 206 with any external devices or networks, including without limitation a service provider's network or a subscriber home network.

Communication portion 404 interfaces to external devices through channel 110. Communication portion 404 may be any known device or method for digital communication, a non-limiting example of which includes a transmission control protocol/internet protocol (TCP/IP) compatible device.

Processor 400 controls the operation of CAS 206. Specifically, processor 400 controls communication portion 404 and IPR management portion 408 and is able to access memory portion 402. Processor 400 may be any known device for system control, a non-limiting example of which includes a microcontroller. Memory portion 402 may be any known device or method for storing digital information.

Memory portion 402 stores digital content and other information, non-limiting examples of which include subscriber network addresses and equipment identification data. Memory portion 402 may be any known device or method for storing digital information. Within the digital content of memory portion 402, particular digital content segments have IP rights associated with that digital content as described below.

IPR management portion 406 carries the IP rights associated with digital content. IPR management portion 406 may be any known device or method for restricting subscribers' usage of digital content. The IP rights may determine the copy, play, transfer, etc. rights associated with particular digital content. These rights may define a time period over which this content may be accessed or, alternatively, limit the number of times a subscriber may access this content. Furthermore, the IP rights may determine how often the user may copy the content associated with the IP rights and define where the copied content may be transferred.

Data bus 408 enables communication between the various elements within CAS 206. Data bus 408 may be any device or method or combination of devices and methods capable of enabling such communications.

In operation, communication portion 404 provides instructions to processor 400. Non-limiting examples of these instructions are authorization data from a service provider technician or a subscriber request transmitted over channel 110. In response to such instructions, processor 400 may access digital content from memory portion 402, package this digital content with its associated IP rights retrieved from IPR management portion 406, and instruct communication portion 404 to send this package over channel 110. The instructions to communication portion 404 may include routing information retrieved from memory portion 402.

This example embodiment illustrates one of many possible structures for a conditional access system. Other structures may be used to achieve the described functions.

Figure 5:
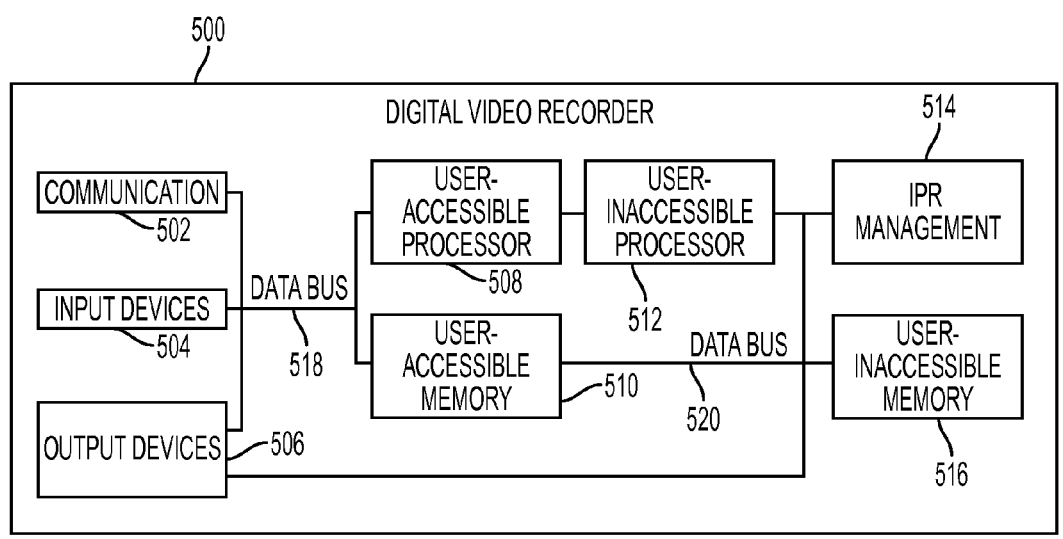
FIG. 5 illustrates an example structural embodiment of a digital video recorder that may be used in accordance with an aspect of the present invention.

FIG. 5 illustrates an example embodiment of a DVR 500 in accordance with an aspect of the present invention.

As illustrated in the figure, DVR 500 includes a communication portion 502, input devices 504, output devices 506, a user-accessible processor 508, a user-accessible memory portion 510, a user-inaccessible processor 512, a user-inaccessible memory portion 516, an IPR management portion 514, a data bus 518, and a data bus 520. In this example, all of communication portion 502, input devices 504, output devices 506, user-accessible processor 508, user-accessible memory portion 510, user-inaccessible processor 512, user-inaccessible memory portion 516, and IPR management portion 514 are distinct devices. However, in other embodiments, at least two of communication portion 502, input devices 504, output devices 506, user-accessible processor 508, user-accessible memory portion 510, user-inaccessible processor 512, user-inaccessible memory portion 516, and IPR management portion 514 may be combined as a unitary device. Further, in some embodiments at least one of input devices 502, output devices 504, communication portion 506, user-accessible processor 508, user-accessible memory portion 510, user-inaccessible processor 512, user-inaccessible memory portion 516, and IPR management portion 514 may be implemented as computer-readable media for carrying or having computer-executable instructions or data structures stored thereon.

Communication portion 502 interfaces to external devices, non-limiting examples of which include subscriber's home networks, storage devices, or a service provider's network. Communication portion 502 may be any known device or method digital communication, non-limiting examples of which include a transmission control protocol/internet protocol (TCP/IP) compatible device.

Input devices 504 are devices used by subscribers to send instructions to the DVR (Shown as part of the DVR). Non-limiting examples of input devices 504 include a remote control, keyboard, and computer mouse. Output devices 506 (also shown as part of the DVR) are devices through which users access digital content to play music, audio-visual or any other works. Non-limiting examples of output devices 506 are speakers, display screens, and printers.

User-accessible processor 508 controls those functions of DVR 500 allowed by a service provider based on instructions from either a subscriber or the service provider. Specifically, user-accessible processor 508 controls communication portion 502, input devices 504, and output devices 506 and accesses user-accessible memory 510. Additionally, user-accessible processor 508 may interact with user-inaccessible processor 512 when encrypted digital content is being handled. User-accessible processor 508 may be any known device for system control, a non-limiting example of which includes a microcontroller.

User-accessible memory portion 510 stores digital content and other data accessible by a service provider or a subscriber as allowed by the service provider. Both encrypted digital content and non-encrypted digital content may be stored in user-accessible memory portion 510. User-accessible memory portion 510 may be any known device or method for storing digital information.

User-inaccessible processor 512 controls those functions of DVR 500 restricted by a service provider to respond only to instructions from the service provider. Specifically, user-inaccessible processor 512 controls IPR management portion 514 and output devices 506 and accesses user-accessible memory portion 510 and user-inaccessible memory portion 516. Additionally, user-inaccessible processor 512 may interact with user-accessible processor 508 when encrypted digital content is being handled. User-inaccessible processor 512 may be any known device for system control.

IPR management portion 514 maintains the IP rights associated with digital content. IPR management portion 514 may be any known device or method for restricting subscribers' access to digital content.

User-inaccessible memory portion 516 stores digital content accessible only by a service provider. User-inaccessible memory portion 516 may be any known device or method for storing digital information, for example an device key.

Data bus 518 enables communication between the user-accessible elements within DVR 500. Data bus 520 enables communication between the user-inaccessible elements within DVR 500.

In operation, input device 504 may direct communication portion 502 to send a request for the service provider to transfer content from user-accessible processor 508. When a content package is received from the service provider through communication portion 502, user-accessible processor 508 may respond in several different ways. If the package includes only non-encrypted digital content, user-accessible processor 508 may simply store the digital content in user-accessible memory portion 510.

The package received from the service provider may, in response to either a user request from input devices 504, or a download instruction from the service provider through communication portion 512, include encrypted content. In these cases, user-accessible processor 508 may store the encrypted digital content in user-accessible memory portion 510 and also interact with user-inaccessible processor 512. User-inaccessible processor 512 then stores the associated IP rights in IPR management portion 514 and stores the device key in user-inaccessible memory portion 516.

User-accessible processor 508 may receive a user request to retrieve digital content from input devices 504. If the requested content is not encrypted, user-accessible processor 508 may simply retrieve the content from user-accessible memory portion 510 and control output devices 506 and to display or play the content.

User-accessible processor 508 may receive a user request from input devices 504 to retrieve encrypted digital content. In this case, user-accessible processor 508 may interact with user-inaccessible processor 512. User-inaccessible processor 512 then retrieves the device key from user-inaccessible memory portion 516, the associated IP rights from IPR management portion 514, and the particular encrypted content from user-accessible memory portion 510. User-inaccessible processor 512 may then decrypt the content in accordance with the IP rights and device key associated with the particular content and control output devices 506 to display or play the content.

User-accessible processor 508 may receive a release instruction from a service provider through communication portion 502. User-accessible processor 508 may respond by retrieving encrypted digital content from user-accessible memory 510 and controlling communication portion 502 or output devices 506 to send the encrypted content to an external storage device or another DVR.

In response to a release instruction, user-accessible processor 508 may also interact with user-inaccessible processor 512. User-inaccessible processor 512 may then retrieve IP rights information from IPR management portion 514 and device keys from user-inaccessible memory portion 516. User-inaccessible processor 512 may control output devices 506 or interact with user-accessible processor 508 to control communication portion 512 and send this data to an external storage device or another DVR.

As discussed above, this example embodiment illustrates one possible structure for a digital video recorder. Other structures may be used to achieve the described functions.

Figure 7:
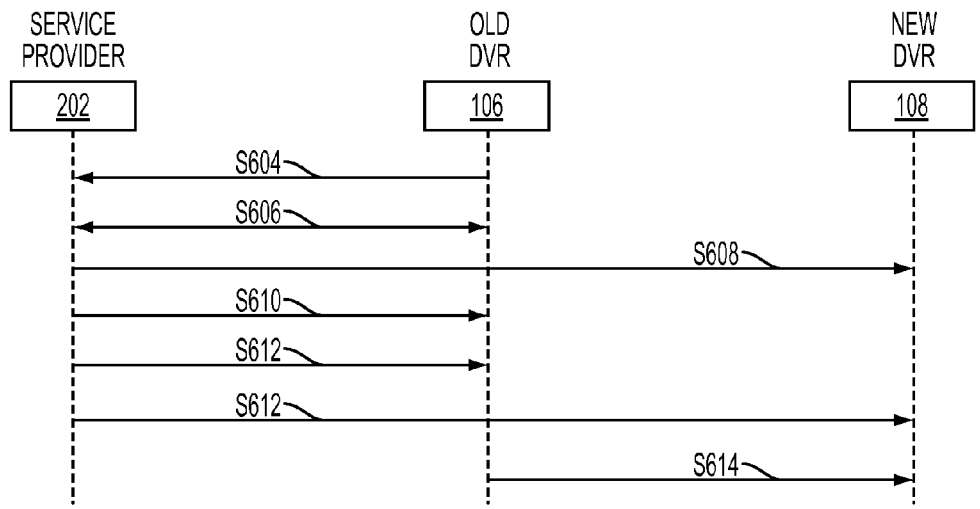
FIG. 7 is an example communication timing diagram illustrating the relative communication timing between a service provider, a first DVR and a second DVR, when transferring content and keys directly to the second DVR in accordance with an aspect of the present invention.
Figure 8:
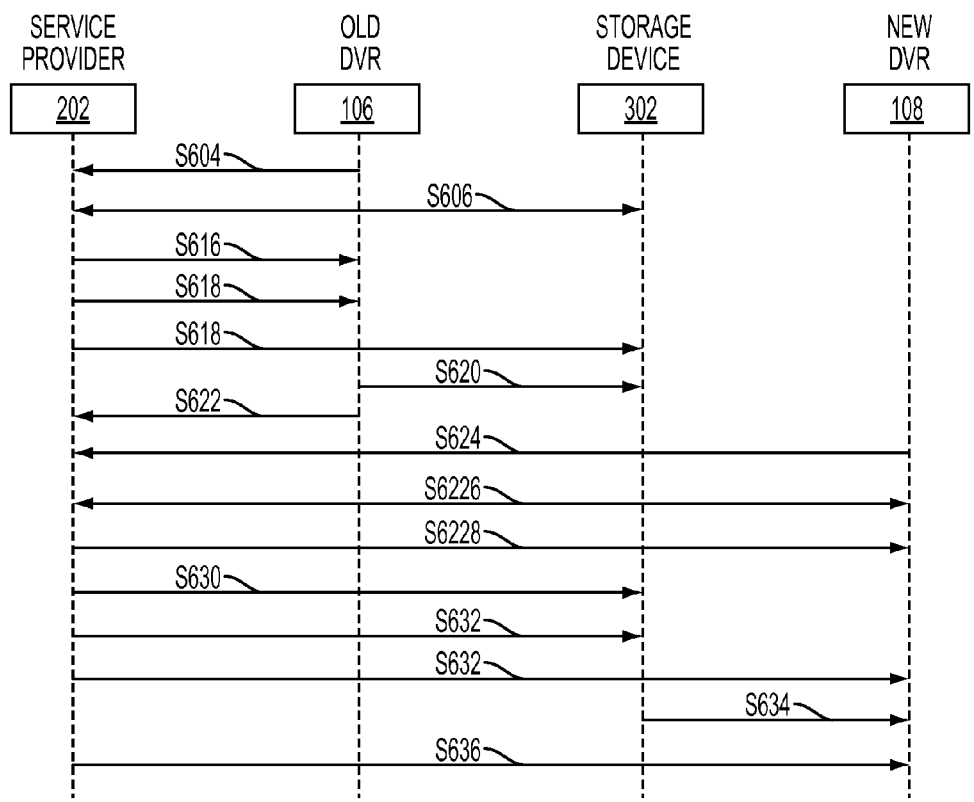
FIG. 8 is an example communication timing diagram illustrating the relative communication timing between a service provider, a first DVR and a second DVR, when transferring content to an intervening storage device in accordance with an aspect of the present invention.

A more detailed discussion of an example method of transferring encrypted digital content from one DVR to another DVR in accordance with aspects of the present invention will now be described with reference to FIGS. 6-8.

Figure 6:
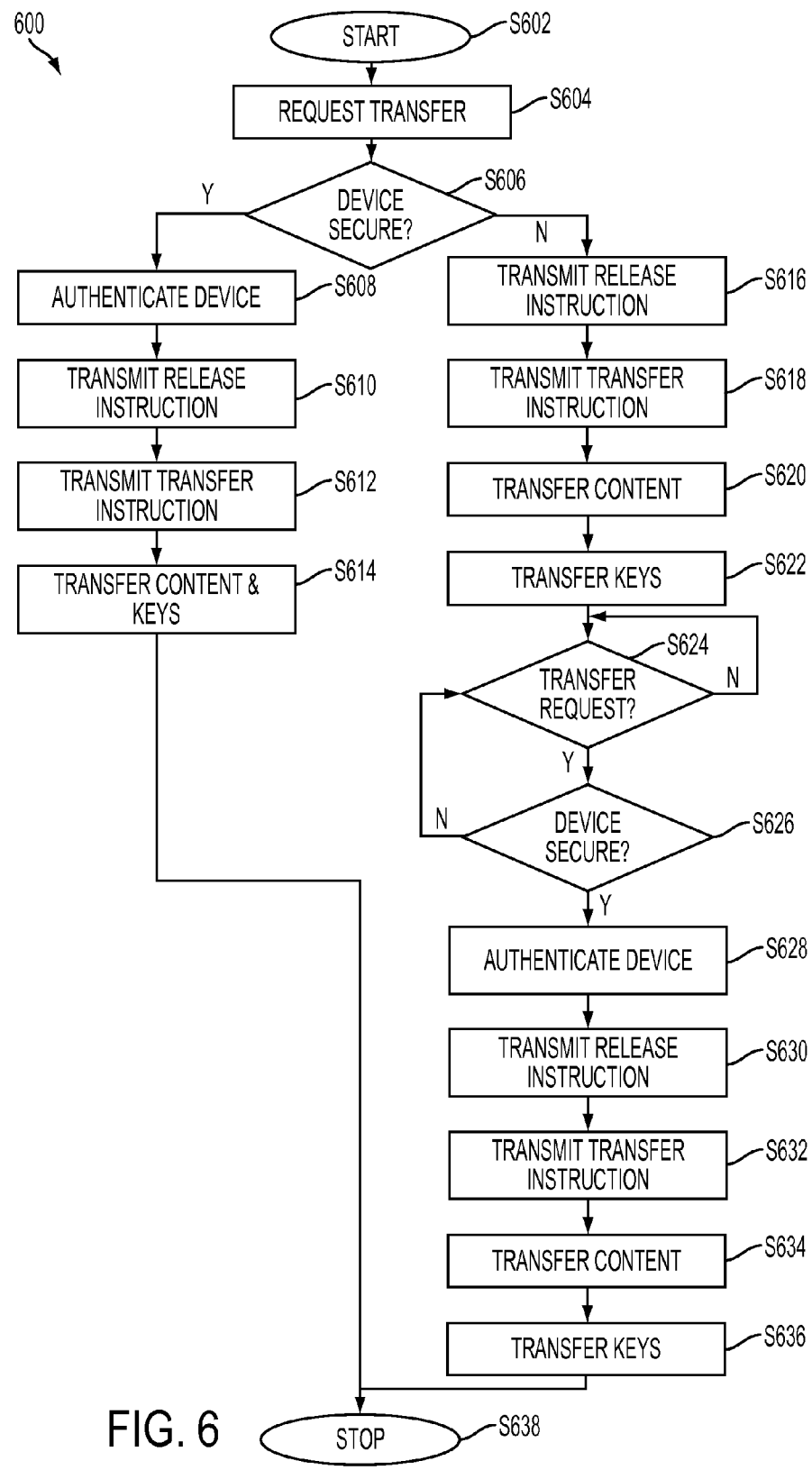
FIG. 6 is a flow chart illustrating an example method 600 of transferring encrypted digital content from one DVR to another DVR in accordance with aspects of the present invention.

FIG. 6 is a flow chart illustrating an example method 600 of transferring encrypted digital content from one DVR to another DVR in accordance with aspects of the present invention. FIG. 7 is an example communication timing diagram illustrating the relative communication timing between service provider 202, DVR 106 and DVR 108, when transferring content and keys directly to DVR 108 in accordance with an aspect of the present invention. FIG. 8 is an example communication timing diagram illustrating the relative communication timing between service provider 202, DVR 106 and DVR 108, when transferring content to an intervening storage device in accordance with an aspect of the present invention.

As seen in FIG. 6, after method 600 starts (S602). In this case, DVR 106 has a device key therein, has received content from service provider 202 and has encrypted the content by way of the device key. Clearly, before DVR 106 had received the content from service provider 202, service provider 202 had authenticated DVR 106 and had determined that DVR 106 is secure.

For purposes of discussion, presume that the owner of DVR 106 wants to replace DVR 106 with a new DVR. As such, a transfer request is made (S604). For example, as illustrated in FIG. 7, DVR 106 may send a request to service provider 202. This may be accomplished by way of channel 110. In some embodiments, this may be accomplished by way of another channel, such as for example a technician at the location of DVR 106 may call to service provider 202 by way of a telephone to make a request.

It is then determined whether there is a new secure device ready to accept the content and the device key (S606). For example, as illustrated in FIG. 7, the technician may provide an indication to service provider 202, that a new secure device is ready to accept the content and the device key. In other embodiments, the indication may be provided by way of a bidirectional handshake between service provider 202 and DVR 108. Either way, service provider 202 must verify that the device that will be accepting the content is secure, and authenticate that device, before service provider 202 will permit transfer of the device key to the device. If DVR 108 is not present at the time of the transfer, then clearly, there will be no indication from the technician or a handshake between service provider 202 and DVR 108.

If it is determined that there is a new secure device ready to accept the content and the device key (S606), then the new secure device is authenticated (S608). Presume for the sake of discussion that DVR 108 is present during the transfer, for example as discussed above with reference to FIG. 2. At this point, as illustrated in FIG. 7, service provider 202 may authenticate DVR 108 by any known authentication protocol. In particular, service provider 202 must verify that the identity of the new DVR is indeed DVR 108.

Once authenticated, a release instruction is transmitted (S610). As illustrated in FIG. 7, service provider 202 may provide a release instruction to DVR 106. In this example embodiment, the release instruction instructs DVR 106 what it will be releasing and to where it will be releasing. In particular, in this example embodiment, the release instruction instructs DVR 106 that DVR 106 will be releasing the encrypted content to DVR 108 and that DVR 106 will be releasing the device key to DVR 108.

Then a transfer instruction is transmitted (S612). As illustrated in FIG. 7, service provider 202 may provide one transfer instruction to DVR 106 and another transfer instruction to DVR 108. In this example embodiment, the first transfer instruction instructs DVR 106 to release the content and the device key, whereas the second transfer instruction instructs DVR 108 to receive the content and the device key.

At this point, the content and device key are transferred (S614). As illustrated in FIG. 7, DVR 106 then transfers the content and the key to DVR 108.

Then method 600 stops (S638).

The case when it is determined that there is no new secure device ready to accept the content and the device key (S606) will be described with further reference to FIG. 8.

Presume for the sake of discussion that DVR 108 is not present during the transfer, for example as discussed above with reference to FIG. 3A. In this example, the content will be transferred to storage device 302. Initially, it is determined whether there is a new secure device ready to accept the content and the device key (S606). For example, as illustrated in FIG. 8, the technician may provide an indication to service provider 202, that a new unsecure device is ready to accept the content. In other embodiments, the indication may be provided by way of a bidirectional handshake between service provider 202 and storage device 302. During the handshake, it will be clear to service provider 202 that storage device 302 is not secure, and therefore should not receive the device key.

Once it is determined that the new device is not secure, a release instruction is transmitted (S616). As illustrated in FIG. 8, service provider 202 may provide a release instruction to DVR 106. This release instruction is different from the release instruction described above with reference to FIG. 7 (and S610). In this example embodiment, the release instruction still instructs DVR 106 what it will be releasing and to where it will be releasing, similar to S610 above. However, in this situation, the release instruction instructs DVR 106 that DVR 106 will be releasing the encrypted content to storage device 302 and that DVR 106 will be releasing the device key to back to service provider 202. In this manner, storage device 302 will not have access to device key.

Then a transfer instruction is transmitted (S618). This transfer instruction is different from the transfer instruction described above with reference to FIG. 7 (and S612). As illustrated in FIG. 8, service provider 202 may provide one transfer instruction to DVR 106 and another transfer instruction to storage device 302. In this example embodiment, the first transfer instruction instructs DVR 106 to release the content and the device key, whereas the second transfer instruction instructs storage device 302 to receive the content. In this situation, the first instruction instructs DVR 106 to release the content to storage device 302 and to release the device key to service provider 202.

At this point, the content is transferred (S620). As illustrated in FIG. 8, DVR 106 then transfers the content to DVR 108.

Then, the device key is transferred (S622). As illustrated in FIG. 8, DVR 106 then transfers the device key to service provider 202. Service provider 202 then stores the device key in key storage 208.

Now the content is stored in storage device 302, whereas the device key is stored at service provider 202. The content and device key may be safely stored in this manner for any period of time. Specifically, although storage device 302 maintains the content, storage device 302 will not have access to the content without the device key. As such, service provider 202 maintains ultimate control of access to the content even though storage device is not a secure device.

At this point, it is determined whether a new transfer is requested (S624). If no transfer is requested, then method 600 remains in a holding pattern (S624). In other words, in accordance with an aspect of the present invention, service provider 202 maintains storage of the device key until a new DVR is brought online to accept the content from storage device 302 and the key from service provider 202.

For purposes of discussion, presume a new transfer is requested (S624). As illustrated in FIG. 8, DVR 108 may send a request to service provider 202. This may be accomplished by way of channel 110. In some embodiments, this may be accomplished by way of another channel, such as for example a technician at the location of DVR 108 may call to service provider 202 by way of a telephone to make a request.

Then it is determined whether the new device is secure (S626). For example, as illustrated in FIG. 8, the technician may provide an indication to service provider 202, that a new secure device is ready to accept the content and the device key. In other embodiments, the indication may be provided by way of a bidirectional handshake between service provider 202 and DVR 108.

If the new device is not secure, then method again waits for a new transfer request (S624). For example, someone may try to obtain the content key without using an authorized DVR. In such a case, service provider may refrain from sending the content key and merely wait for a new transfer request.

If the new device is secure (S626), then the new device is authenticated (S628). Presume for the sake of discussion that DVR 108 is now present for the transfer, for example as discussed above with reference to FIG. 3B. At his point, as illustrated in FIG. 8, service provider 202 may authenticate DVR 108 by any known authentication protocol. In particular, service provider 202 must verify that the identity of the new DVR is indeed DVR 108.

Once the new device is authenticated, a release instruction is transmitted (S630). As illustrated in FIG. 8, service provider 202 may provide a release instruction to storage device 302. In this example embodiment, the release instruction instructs storage device 302 what it will be releasing and to where it will be releasing. In particular, in this example embodiment, the release instruction instructs storage device 302 that storage device 302 will be releasing the encrypted content to DVR 108.

Then a transfer instruction is transmitted (S632). As illustrated in FIG. 8, service provider 202 may provide one transfer instruction to storage device 302 and another transfer instruction to DVR 108. In this example embodiment, the first transfer instruction instructs storage device 302 to release the content, whereas the second transfer instruction instructs DVR 108 to receive the content and the device key.

The content is then transferred (S634). As illustrated in FIG. 8, storage device 302 then transfers the content to DVR 108.

Then the device key is transferred (S636). As illustrated in FIG. 8, service provider 202 then transfers the device key to DVR 108.

Finally, method 600 stops (S638).

In the example embodiment discussed above, the transmission of the release instruction and the transmission of the transfer instruction are described as two separate actions, for example in S610 and S612, S616 and S618, and S630 and S632. However, in some embodiments, these actions may be completed simultaneously.

In the example embodiment discussed above, the transmission of the release instruction is performed prior to the transmission of the transfer instruction. For example S610 is performed prior to S612, S616 is performed prior to S618, and S630 is performed prior to S632. However, in some embodiments, the transmission of the transfer instruction is performed prior to the transmission of the release instruction.

In the example embodiment discussed above, the content transfer and the device key transfer are described as two separate actions, for example in S620 and S622, and S634 and S636. However, in some embodiments, these actions may be completed simultaneously.

In the example embodiment discussed above, the content transfer is performed prior to the device key transfer. For example S620 is performed prior to S622 and S634 is performed prior to S636. However, in some embodiments, the device key transfer is performed prior to the content transfer.

As described above, the present invention provides a method of transferring encrypted digital content from one DVR (or external storage device) to another DVR (or to an external storage device), that is controllable by a service provider and does not place an undue burden on the service provider or subscriber.

In accordance with an aspect of the present invention, a method is provided of transmitting instructions from a service provider to a subscriber home, thereby transferring both encrypted digital content and a DVR's device key from the DVR to another DVR. A release instruction enables the movement of digital content and the device key from the original DVR. A download instruction enables the receipt of digital content either directly by the other DVR or by a separate storage device in the subscriber home. Digital content then transfers from the original DVR to either the other DVR or the storage device.

If transferring digital content directly to another DVR, an device key from the original DVR is also transfers directly to the other DVR. If transferring digital content to a storage device, the device key transfers to a separate key storage under the control of the service provider.

If transferring digital content to a storage device, an additional release instruction enables the movement of digital content from the storage device to another DVR. An additional download instruction enables the receipt of the digital content and device key of the original DVR by the other DVR. Digital content then transfers from the storage device to the other DVR and the device key of the original DVR then transfers to the other DVR.

Aspects of the present invention provide benefits over conventional DVRs. In accordance with aspects of the present invention, the encrypted content may be quickly and easily transferred from one DVR to another DVR, without providing the subscriber with access to the device keys associated with the encrypted content. Accordingly, a subscriber may easily replace an old DVR, having encrypted content stored thereon, with a new DVR, and retain the ability to access the encrypted content in accordance with the associate data rights.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A method of transferring encrypted digital content from a digital recording device the method comprising:
   receiving, by a service provider computer system, an indication that a first recording device at a subscriber location is being replaced, the first recording device storing encrypted digital content and a digital key for decrypting at least part of the encrypted digital content;
   determining, by the service provider computer system, whether a second recording device replacing the first recording device is available to receive the encrypted digital content;

responsive to determining that the second recording device is not available to receive the encrypted digital content, transmitting, by the service provider computer system to the first recording device, instructions to transmit the encrypted digital content to a storage device and transmit the digital key to the service provider computer system;

storing, by the service provider computer system, the digital key received from the first recording device; and responsive to receiving an indication that the second recording device is available to receive the encrypted digital content, transmitting, by the service provider computer system to the second recording device, the stored digital key.

2. The method of claim 1, further comprising authenticating the second recording device.

3. The method of claim 1, wherein the digital key is stored in a key storage by the service provider computer system.

4. The method of claim 1, further comprising:

responsive to receiving an indication that the second recording device is available to receive the encrypted digital content, transmitting, by the service provider computer system, an instruction to the storage device to transmit the encrypted digital content to the second recording device.

5. The method of claim 1, wherein the digital key received from the first recording device includes information identifying the first recording device, and the digital key is modified to identify the second recording device.

6. The method of claim 1, wherein the service provider computer system is at a location different from the subscriber location.

7. The method of claim 1, wherein the second recording device is available to receive the encrypted digital content responsive to the second recording device being setup and authenticated by the service provider computer system.

8. The method of claim 1, wherein the second recording device is available to receive the encrypted digital content responsive to completing a bidirectional handshake with the service provider computer system.

9. The method of claim 1, wherein transmitting instructions to transmit the encrypted digital content to the storage device comprises transmitting a release instruction to the first recording device and a download instruction to the storage device.

10. A non-transitory computer-readable media having computer-readable instructions stored thereon for:

receiving, by a service provider computer system, an indication that a first recording device at a subscriber location is being replaced, the first recording device storing encrypted digital content and a digital key for decrypting at least part of the encrypted digital content;

determining, by the service provider computer system, whether a second recording device replacing the first recording device is available to receive the encrypted digital content;

responsive to determining that the second recording device is not available to receive the encrypted digital content, transmitting, by the service provider computer system to the first recording device, instructions to transmit the encrypted digital content to a storage device and transmit the digital key to the service provider computer system;

storing, by the service provider computer system, the digital key received from the first recording device; and responsive to receiving an indication that the second recording device is available to receive the encrypted digital content, transmitting, by the service provider computer system to the second recording device, the stored digital key.

11. The non-transitory computer-readable media of claim 10, the computer-readable instructions further for authenticating the second recording device.

12. The non-transitory computer-readable media of claim 10, wherein the digital key is stored in key storage by the service provider computer system.

13. The non-transitory computer-readable media of claim 10, the computer-readable instructions further for:

responsive to receiving the indication that the second recording device is available to receive the encrypted digital content, transmitting, by the service provider computer system, an instruction to the storage device to transmit the encrypted digital content to the second recording device.

14. A service provider system comprising:

one or more computer processors; and non-transitory computer-readable media having computer-readable instructions executed by the one or more computer processors for:

receiving an indication that a first recording device at a subscriber location is being replaced, the first recording device storing encrypted digital content and a digital key for decrypting at least part of the encrypted digital content;

determining whether a second recording device replacing the first recording device is available to receive the encrypted digital content;

responsive to determining that the second recording device is not available to receive the encrypted digital content, transmitting to the first recording device instructions to transmit the encrypted digital content to a storage device and transmit the digital key to the service provider computer system;

storing the digital key received from the first recording device; and responsive to receiving an indication that the second recording device is available to receive the encrypted digital content, transmitting to the second recording device the stored digital key.

* * * * *